June 24, 1969  E. F. EDELMANN ET AL  3,451,876
PLASTIC LIGHT-TRANSMITTING PANEL
Filed May 28, 1964
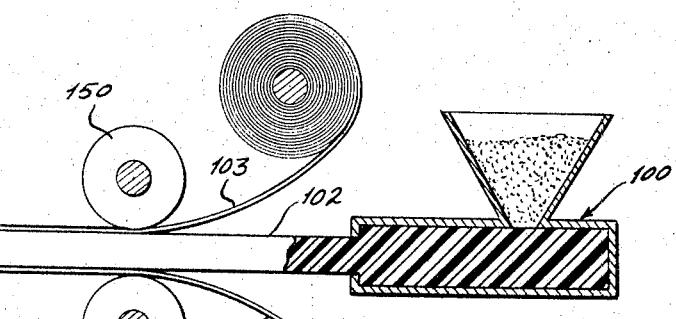
FIG.1
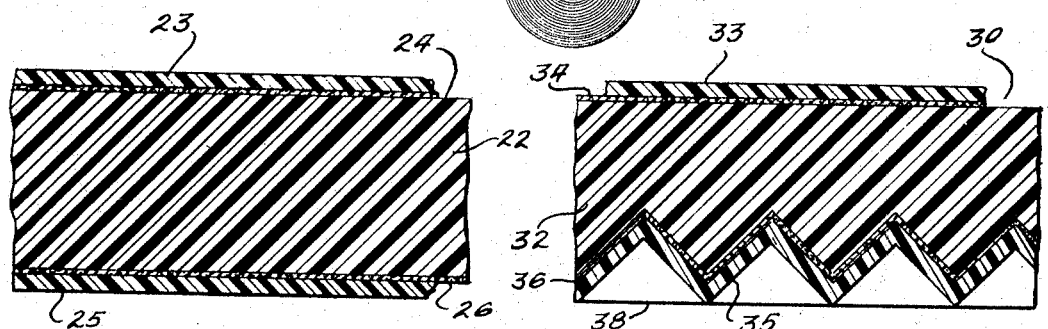
FIG.2　　　　　　FIG.3
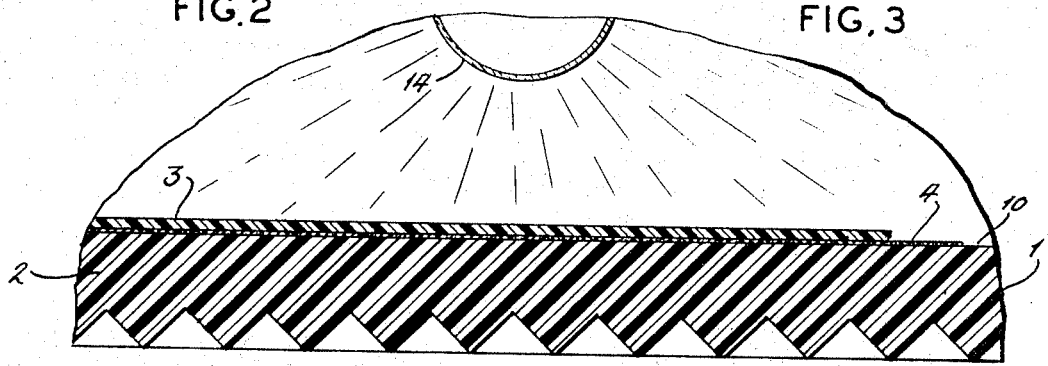
FIG.4
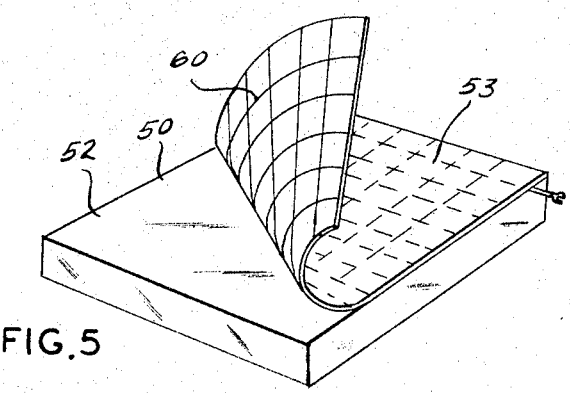
FIG.5
INVENTORS:
EUGENE F. EDELMANN
RICHARD S. HAWES III
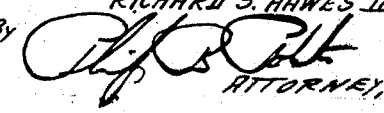
ATTORNEY United States Patent Office 3,451,876
Patented June 24, 1969

3,451,876
PLASTIC LIGHT-TRANSMITTING PANEL
Eugene F. Edelmann, Bridgeton, and Richard S. Hawes III, Creve Coeur, Mo., assignors to K-S-H, Inc., a corporation of Missouri
Filed May 28, 1964, Ser. No. 370,887
Int. Cl. B44f 1/04; B32b 27/30, 27/06
U.S. Cl. 161—2                                     1 Claim

ABSTRACT OF THE DISCLOSURE

A panel for use in fluorescent lighting fixtures includes a light-transmitting polystyrene base with broad faces, a thin film of polyvinyl fluoride adhesively secured to a broad face of the base and an ultraviolet screening agent between the free surface of the film and the face of the base to which the film is adhered.

Background of the invention

This invention relates to light-transmitting panels made of organic thermoplastic material, and methods of their manufacture. The invention has particular application to lighting panels used in fluorescent fixtures, but its application is not confined thereto. For example, the panels of this invention, and made by the method of this invention, can be used for glazing, as screens or shower door panels and the like, and for outdoor advertising signs.

Organic thermoplastic light-transmitting panels have a number of advantages over glass panels. The organic thermoplastic panels are lighter, less liable to breakage, and more flexible in both use and manufacture. Heretofore, they have had certain readily apparent disadvantages. Many of them have been liable to degradation upon exposure to ultraviolet light, which has led to an objectionable discoloring, at least. They have tended to accumulate static (electrical) charges. They have been either flammable or have given off great quantities of black smoke, or both, when exposed to high temperatures. They have been liable to surface scratches, because their surface hardness has been low. They have also been liable to injury by harsh cleaning compositions.

One of the objects of this invention is to provide light-transmitting panels of organic thermoplastic material which are highly resistant to degradation from exposure to ultraviolet light and which have less tendency to accumulate static charges, are more fire resistant, more scratch resistant, and more resistant to the detrimental effects of harsh cleaning compounds than such panels known heretofore.

Other objects will become apparent to those skilled in the art in the light of the following description and accompanying drawing.

Summary of the invention

In accordance with this invention, generally stated, a light-transmitting panel is provided which is made up of a base sheet of organic thermoplastic material and a relatively thin film of polyvinyl fluoride, adhesively secured together. A surface of the film constitutes an exterior surface of the panel. A film of polyvinyl fluoride can be adhesively secured to both broad faces of the base, or to only a face of the base which is to be exposed to a great deal of ultraviolet radiation as in a fluorescent light fixture.

Ultraviolet screening agent is provided between the exterior surface of the film and the surface of the base to which the film is secured. Preferably, the ultraviolet screening agent is incorporated into the polyvinyl fluoride film. The ultraviolet screening agent may be incorporated into an adhesive between the polyvinyl fluoride film and the base, but this has certain disadvantages.

Preferably, also, the base material is polystyrene.

In the preferred method of this invention, a polyvinyl fluoride film, etched on one surface, is coated, on that surface, with a suitable adhesive. The film is then applied, adhesive side in, to a broad face of a sheet of thermoplastic material as the sheet emerges from an extruder. The sheet is hot, for example, in the neighborhood of 275° F., and the hot sheet and the film are passed between rolls which exert a pressure on the film and sheet sufficient to cause the adhesive to bond the film and sheet together permanently.

It has been found that the film and sheet can be passed between embossing rolls, to emboss either a side of the panel on which the film is applied, or one on which it has not. The presence of the film on the plane side of a panel which is embossed on only one side has been found to produce a very flat surface on the plane side, and to permit the holding of angles of the embossed side to closer tolerances than would otherwise be possible.

It has also been found that after the film has been adhered to the sheet, either concurrently with the extrusion process or subsequently, the panel can be vacuum formed even more readily than the base sheet could be vacuum formed without the film.

The adhesive used is preferably an emulsified or dissolved polymeric material. The base sheet itself can be treated to make the film adhere to it, either by applying an adhesive to the base sheet or by using a suitable solvent or solvent- emulsifier so as to convert a portion of the surface material to a suitably adhesive state.

The film may be printed, preferably on the surface which is to be adhered to the base. A grid, printed in conductive ink, can be provided to eliminate problems of radio interference which have been of concern with conventional fluorescent fixtures. Decorative designs, advertising or instructional information and the like can thus easily be incorporated into the panel in a way in which the printing is permanently protected from the effects of ultraviolet radiation, attrition by the elements and damage from harsh cleaning compounds and the like.

The surface of the polyvinyl fluoride film is smooth and abrasion resistant, and, when properly prepared before its application, receptive to paint. It has less tendency to accumulate static charges and is more resistant to solvents than polystyrene, the acrylics and similar thermoplastics.

Brief description of the drawings

In the drawing:
FIGURE 1 is a schematic view illustrating one embodiment of method of producing light-transmitting panels of this invention;
FIGURE 2 is an enlarged fragmentary sectional view of one embodiment of panel of this invention;
FIGURE 3 is an enlarged fragmentary sectional view of another embodiment of panel of this invention;
FIGURE 4 is an enlarged fragmentary sectional view of still another embodiment of panel of this invention; and
FIGURE 5 is a somewhat disproportionate view in perspective of still another embodiment of panel of this invention, with a section of film shown pulled back to illustrate printed matter, in the form of a conductive grid, on the side of the film adhered to the base.

Description of the preferred embodiments

Referring now to FIGURE 4 of the drawing, for one illustrative example of panel of this invention, reference numeral 1 indicates a completed lighting panel, made up of a light-transmitting (transparent or translucent) polystyrene base sheet 2, a light-transmitting polyvinyl fluoride film 3, and a light-transmitting adhesive 4, bonding the base 2 and the film 3 together.

In this embodiment of panel, the film 3 is bonded only to a plane surface 10 of the base sheet, on a side from which ultraviolet radiation, illustrated schematically by a fluorescent lamp tube 14, is expected to come.

In the embodiment shown in FIGURE 2, a film 23, of polyvinyl fluoride is bonded, by means of adhesive 24, to one broad face of a base 22, and another film 25 of polyvinyl fluoride is bonded to a second broad face of the base 22 by means of adhesive 26.

In the embodiment shown in FIGURE 3, a broad face 38 of a base 32, to which a film 35 of polyvinyl fluoride has been bonded by means of adhesive 36, has been embossed to form poly-sided concavities. A plane face 30 has a film 33 of polyvinyl fluoride bonded to it by adhesive 34.

FIGURE 1 illustrates schematically one method of forming the panel of this invention. An extruder 100 is shown as extruding a base sheet 102 of polystyrene. Films 103 and 105, coated on one side with adhesive, not here visible, are shown as being fed from coils of film to the two broad surfaces of the hot sheet. The adhesive side of the film is, of course, toward its particular surface of the base sheet. The film and base sheet are then passed through the nip of rolls 150, which exert upon the film and sheet a pressure on the order of five to ten pounds per square inch. The base sheet, at this time, is at a temperature of about 275° F.

A suitable polyvinyl fluoride film is sold commercially under the trademark Tedlar, by E. I. du Pont de Nemours & Company. In order to obtain the desired bonding characteristics, one surface of the polyvinyl fluoride film, to which the adhesive is to be applied, is etched. The adhesive can be a plasticized methyl methacrylate adhesive, with methyl ethyl ketone as a solvent. A suitable adhesive is identified as No. 6840 by the Du Pont Company.

In the preferred emobdiment, an ultraviolet screening agent is incorporated into the polyvinyl fluoride film. Various ultraviolet screening agents are well known to the art. For example, hydroxyphenyl benzotriazoles (e.g., Tinuvin P, Geigy), benzophenones (e.g., UV–9, American Cyanamide), metal complexes (e.g., Nuostable 1237, Nuodex Products Division, Hayden-Newport Chemical Company), resorcinols (e.g., DBI, Dow Chemical Co.), and salicylates (e.g., Salol, Dow Chemical Company), are well known types of ultraviolet screening agents. Of these, the hydroxyphenyl benzotriazoles and benzophenones are preferred for the present application. A suitable polyvinyl fluoride film, containing an ultraviolet screening agent is available from the Du Pont Company under the trademark Tedlar, type 100 XRU 101 TR.

The film is preferably on the order of five ten-thousandths to one one-thousandths (.0005–.001) inch thick. The base sheet is preferably on the order of fifteen to three hundred and seventy-five thousandths (.015–.375) inch thick.

While it is by no means the preferred embodiment, it is practicable to put the ultraviolet screening agent in the adhesive layer. This requires more ultraviolet screening agent, and has the disadvantage that the adhesive layer immediately contiguous the film has a tendency to degrade with exposure to ultraviolet radiation, since the amount of screening is a function of the distance of travel of the radiation through the screening agent.

The use of polystyrene as a base has numerous advantages, but various other polymeric, thermoplastic materials can also be used. For example, polyvinyl chloride, acrylates, e.g., methyl methacrylate co-polymers, and polyethylene can be used. All of these can be made light-transmitting, all are capable of extrustion and vacuum forming, all are subject to some degree of ultraviolet degradation, all have a tendency toward accumulating static charges, and all are either flammable or emit large quantities of black smoke when exposed to high temperatures.

It has been found that the use of the film of polyvinyl fluoride containing the ultraviolet screening agent renders polystyrene lighting panels practically immune to the effects of ultraviolet radiation, and this effect is also produced with the other bases. However, this is not the only superior result obtained, by any means. The film provides a surface which is resistant to abrasion, to the attrition of weather, and to solvents; it reduces the tendency to accumulate a static charge, it inhibits combustion and even the production of the black dense smoke characteristic of the plastics of which the base is made. Still another unexpected property of the panel is its improved molding characteristics. For example, the panel of this invention can be drawn and formed more easily and quickly than a panel of the base sheet alone. The heating cycle is shorter. In the embossing of an extruded panel, the provision of the film on the plane side of a panel, one surface of which is embossed, insures a flatter plane surface, and permits sharper definition of the embossed pattern than is otherwise obtainable.

In the embodiment of panel shown in FIGURE 5, a grid 60 of conductive material, is shown as being printed on a film 53, of polyvinyl fluoride on the surface of the film to which an adhesive, not here shown, is subsequently applied. The film 53 is adhered to a face 50 of a base 52 of organic thermoplastic material. This conductive grid has the virtue, peculiar to itself, of eliminating radio interference. It also, however, illustrates the printing of any desired pattern or indicia. It can be seen that, printed on the adhesive side of the film, the printed matter is protected against weathering, abrasion, and, when the film contains an ultraviolet screening agent, against the effects of ultraviolet radiation.

Having thus described the invention, what is claimed and desired to be secured by Letters Patent is:

1. A panel for use in fluorescent lighting fixtures comprising a base of light-transmitting polystyrene .015 inch to .375 inch thick, having one broad plane face and one broad embossed face, a film of light-transmitting polyvinyl fluoride .0005 inch to .001 inch thick having a broad surface adhesively secured to one of the broad faces of said base, and an ultraviolet screening agent between the free surface of the film and the adhesively secured face of the base.

References Cited

UNITED STATES PATENTS

| | | | |
|---|---|---|---|
| 2,776,452 | 1/1957 | Chavannes | 264—90 |
| 2,875,087 | 2/1959 | Crandon | 117—10 |
| 2,970,066 | 1/1961 | Brasure | 117—33.3 |
| 3,025,198 | 3/1962 | Dunn | 161—189 X |
| 3,067,078 | 12/1962 | Gluck | 161—119 |
| 3,133,854 | 5/1964 | Simms | 161—189 |

FOREIGN PATENTS

| | | |
|---|---|---|
| 598,440 | 2/1948 | Great Britain. |
| 805,388 | 12/1958 | Great Britain. |

ROBERT F. BURNETT, *Primary Examiner.*

WILLIAM T. POWELL, *Assistant Examiner.*

U.S. Cl. X.R.

40—136; 156—3, 220, 244, 277, 500; 161—5, 119, 189, 408, 413; 240—2; 264—1, 171